United States Patent [19]

Ito et al.

[11] Patent Number: 4,557,704
[45] Date of Patent: Dec. 10, 1985

[54] JUNCTION STRUCTURE OF TURBINE SHAFT

[75] Inventors: Masaya Ito, Aichi; Seiji Mori, Konan; Noboru Ishida, Kakamigahara, all of Japan

[73] Assignee: NGK Spark Plug Co., Ltd., Nagoya, Japan

[21] Appl. No.: 666,913

[22] Filed: Oct. 31, 1984

[30] Foreign Application Priority Data

Nov. 8, 1983 [JP] Japan ................. 58-208344

[51] Int. Cl.[4] .......................... F16C 3/00; F01D 25/00
[52] U.S. Cl. ................................... 464/181; 464/183; 416/241 B; 415/214
[58] Field of Search .............. 428/627, 632, 633, 621, 428/448, 450, 472; 464/181, 183, 903, 179; 416/241 B; 415/214; 228/122, 124, 174, 903, 263.17

[56] References Cited

U.S. PATENT DOCUMENTS

| | | |
|---|---|---|
| 3,801,226 | 4/1974 | Bevan et al. ............ 416/241 B |
| 3,901,622 | 8/1975 | Ricketts ..................... 415/214 |
| 4,063,850 | 12/1977 | Hueber et al. ............ 415/214 |
| 4,279,576 | 7/1981 | Okano et al. ............. 416/241 B |
| 4,363,631 | 12/1982 | Wloka ..................... 464/181 |
| 4,396,445 | 8/1983 | Sasaki et al. ............ 416/241 B |
| 4,408,959 | 10/1983 | Long et al. ............... 416/241 B |
| 4,424,003 | 1/1984 | Brobeck .................. 416/241 B |

FOREIGN PATENT DOCUMENTS

| | | |
|---|---|---|
| 2734747 | 2/1979 | Fed. Rep. of Germany ... 416/241 B |
| 168004 | 10/1982 | Japan ..................... 416/241 B |
| 13679 | 1/1984 | Japan ..................... 228/122 |

*Primary Examiner*—Peter K. Skiff
*Assistant Examiner*—John J. Zimmerman
*Attorney, Agent, or Firm*—Wegner & Bretschneider

[57] ABSTRACT

Composite turbine shaft includes a ceramic shaft and a metal shaft, both ends being butt-joined by brazing wherein a center void is provided in the ceramic shaft end so as to secure good heat insulation as well as strong junction even under the difference in thermal expansion between the ceramic shaft and the metal shaft.

9 Claims, 9 Drawing Figures

JUNCTION STRUCTURE OF TURBINE SHAFT

FIELD OF THE INVENTION

The present invention relates to a turbine shaft having an improved junction structure.

BACKGROUND OF THE INVENTION

Recently, ceramic materials have been under development in view of the heat resistance thereof. In many cases, heat-resistant ceramic materials have found main use in the peripheral parts of engines. Among others, it has practically been desired to make the turbine blades used with gas turbine engines, turbochargers, etc. of ceramic materials due to increase in the operation temperature and decrease in the weight thereof and, hence, an improvement in the response characteristics thereof.

In practical use, so high is the temperature of the joined turbine blades that attention should be paid to the insulation of heat transmitted therefrom in view of the durability of the associated bearing parts and lubricating oils.

Turning now to FIG. 1, there is shown the basic structure of a typical gas turbine (or a turbocharger). As well-known in the art, a casing shown generally at 1 is constructed from three casing members, the first being a turbine casing 2 including therein an inlet and an outlet both for exhaust gases, the second a compressor casing 4 including therein an air suction port and an air discharge port, and the third being a bearing casing interposed therebetween. A turbine rotor 5 extends axially through the central portions of the three casings. A hot exhaust gas discharged from an engine, etc. is introduced into the casing 2 through an inlet 21 to rotate a turbin disc 51 (usually made of ceramic material) at a high speed, and is discharged therefrom through a central gas outlet 23. A shaft 53 formed of a ceramic material solid with the turbin disc 51 and a metal shaft 53 joined thereto are journalled and axially positioned by the bearing casing 3, so that the turbine disc 51 rotates under the lubricating action of an oil supplied from an oil port 31, thereby to rotate at a high speed a compressor disc 54 housed within a compressor disc chamber 41 and fixedly fitted over the metal shaft 53. Air is sucked through an air suction port 42, is compressed in the disc 54, and is supplied into an internal combustion engine, etc. through the compressor casing 4.

In the case of currently used metal turbine blades, on the other hand, a void 64 for heat insulation is defined in both the end 62 of the turbine rotor 62 formed of a heat-resistant alloy and the end of a metal shaft 63 joined thereto with the contact surface of both being welded together, as will be understood from FIG. 2(a) illustrative of the junction structure. Since the metal shaft 63 is practically cooled by an oil thus heat is primarily transferred through the central portion of that shaft, it may be said that such a void 64 well performs its insulating function due to it's central location.

In the case of ceramic turbine blades solid with which the associated rotor and shaft are formed of ceramics, however, it is difficult to apply the heat insulation structure similar to that applied to the metal turbine blades, since the coefficient of thermal expansion of ceramics is lower than that of metals.

SUMMARY OF THE DISCLOSURE

It is an object of the present invention to provide a novel junction structure of a joined shaft wherein the junction between a ceramic shaft and a metallic shaft having a different coefficients of thermal expansion from the former may be secured.

It is a further object of the present invention to provide a novel junction structure of a turbine shaft wherein the junction between a ceramic shaft and a metallic shaft can be secured at a higher operation temperature of a gas turbine.

According to the present invention, there is provided a junction structure of a turbine shaft comprising a ceramic shaft and a metal shaft butt-joined to the end of the ceramic shaft, wherein a void for heat insulation is provided only within the central portion of the ceramic shaft.

Based on this structure the residual stress produced at the junction due to the difference in the coefficient of thermal expansion can be reduced so as to ensure a stronger junction as well as the heat from the hot turbine rotor may be effectively insulated due to the presence of the center insulation void.

Namely, an improved junction structure for heat insulation is obtained by the provision of a void for heat insulation in the ceramic rotor shaft alone.

BRIEF DESCRIPTION OF THE DRAWING

The foregoing and other objects and features of the present invention will become apparent from the following detailed description with reference to the accompanying drawings, in which.

DETAILED DESCRIPTION OF THE PREFERRED EMBODIMENTS

In the following the features of the present invention will be described with reference to the accompanying Drawings and preferred embodiments.

The ceramic shaft is preferably solid with a turbine rotor which comprises a turbine hub and blades both formed in a solid body.

Figure 1:
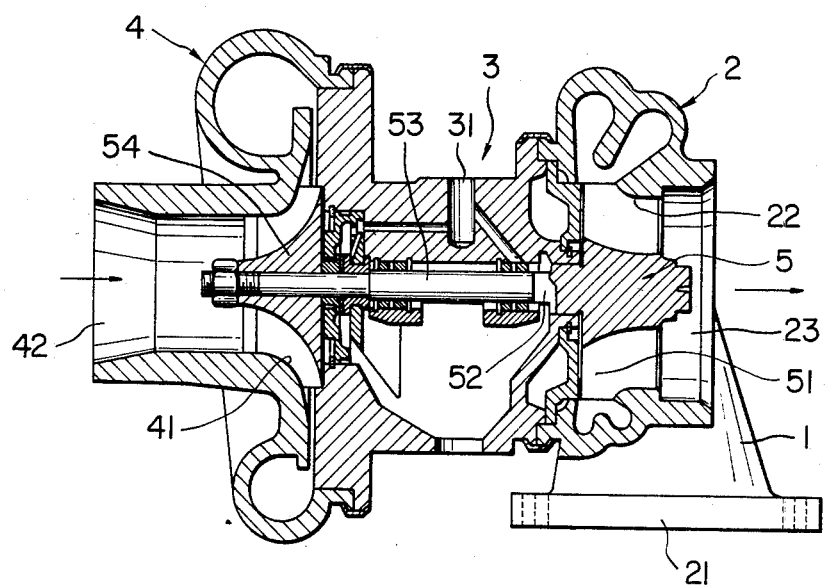
FIG. 1 is a longitudinal section showing one embodiment of a gas turbine.
Figure 2A:
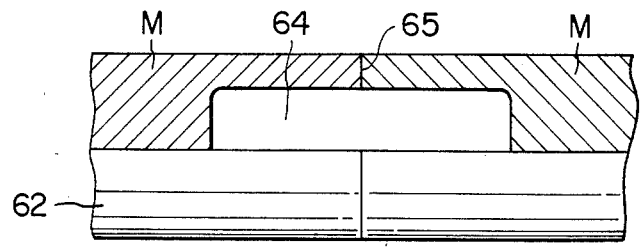
FIG. 2(a) shows a longitudinal partial section of the junction structure of the ends of a turbine rotor metal shaft and a metal shaft.
Figure 2B:
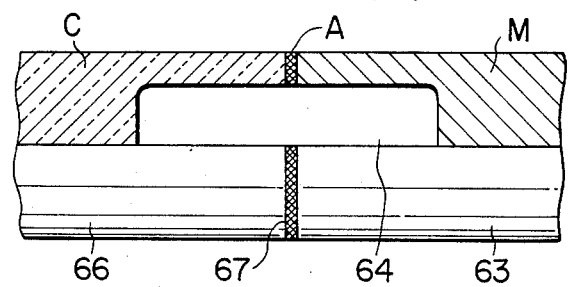
FIG. 2(b) shows a longitudinal partial section of the junction structure between a turbine rotor ceramic shaft and a metal shaft for the comparison purpose.

This will now be explained with reference to one comparative embodiment of the junction of the end of a ceramic turbine rotor shaft with a metal shaft, as shown in FIG. 2(b). As illustrated, it might be designed that the end 66 of a ceramic turbine rotor shaft is joined to a metal shaft 63 with an intermediate buffer layer 67 therebetween, said buffer layer having a coefficient of thermal expansion lying between those of the ceramic shaft and the metal shaft, wherein a void 64 for heat insulation, which is similar to that illustrated in FIG.

2(a), is provided, and a groove (not shown) for heat insulation is formed in the surface of the metal shaft 63. It was surmised that such an arrangement might provide a good junction structure in which a difference in the coefficient of thermal expansion between the ceramic and metal shafts is eliminated, but it has turned out that a good junction structure cannot be obtained for the following reasons.

Figure 2C:
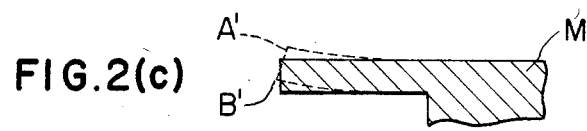
FIG. 2(c) shows the deformation of the end of the metal shaft of FIG. 2(b) on a point A.
Figure 2D:
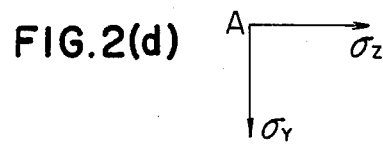
FIG. 2(d) is a vector diagram on the point A.

Now considering a point A on the end face of the ceramics joined to the metal, the point A receives stress $\sigma_\gamma$ in the direction perpendicular to the axis is exerted to the point A due to the contraction upon cooling of the metal shaft, and sustains axial stress $\sigma_z$ due to the deformation of the junction between the ceramic and metal shafts, as illustrated in FIG. 2(d). More specifically, after the metal shaft 63 of FIG. 2(b) has been at a high temperature joined to the end 66 of the ceramic rotor shaft, it contracts due to cooling. Due to a small extent of contraction of the ceramics, however, the metal shaft, which would take the form as shown by the solid lines in FIG. 2(c) at a free end thereof, is pulled by the ceramics and contracts, in the vicinity of the junction of both, resulting in a form as shown by the dotted lines in FIG. 2(c). Therefore, the point A' sustains a force to pull the ceramics, while a point B' sustains a force to compress the ceramics, so that no satisfactory junction is achieved.

As stated above, in the case where the difference in the thermal expansion is compensated or absorbed by the deformation of the metal shaft, the resulting residual internal stress causes secondary force to act upon the ceramics. Accordingly, it is appreciated that the less the deformation of the metal shaft, the less the residual stress (particularly axial stress $\sigma_z$ applied to the ceramics), resulting in improvements in the junction structure.

In view of the foregoing, an improved junction structure capable of heat insulation is realized by the present invention by providing a center void for heat insulation in the ceramic rotor shaft at the junction end thereof.

Figure 2E:
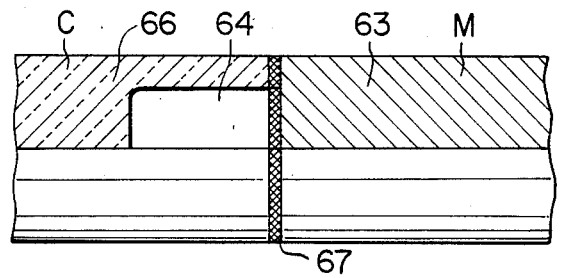
FIG. 2(e) shows a partly longitudinal section of the structure of the junction of a turbine rotor shaft and a metal shaft according to the present invention.

Referring to FIG. 2(e), although the illustrated embodiment is similar to that of FIG. 2(b) in that an end 66 of a ceramic turbine rotor shaft is joined to a metal shaft 63 with an intermediate buffer layer 67 being disposed therebetween, a void 64 for heat insulation is provided in the end 66 of the ceramic turbine rotor shaft. In accordance with this arrangement, heat transferred from the metal shart 63 is insulated by air within the void 64, and there is no room for the occurrence of uneven axial compression and tension force caused by the metal shaft which is experienced in the case of FIG. 2(b). Thus, the residual stress in the ceramics is reduced. Practically, that junction is positioned in the vicinity of turbine blades, whereby the portions required to undergo post-processing such as oil seal grooves can also be located on the part of the metal shaft. Accordingly, the processing becomes easier compared with the processing of ceramics, and the service life of a cutting bite is extended, thus resulting in a drop of the processing cost. The embodiment of the present invention is further advantageous in that the provision of the void for heat insulation within the ceramic shaft maintained at higher temperatures makes a greater contribution to the insulating effect.

The ceramic materials which may be used in the present invention are ceramic materials with high strength, low extension and good resistance to oxidation such as silicon nitride, silicon carbide, sialon and the like.

The metal shaft material which may be used in the present invention associated with the ceramic shaft encompasses alloy steels such as SCM435, SCM440, SNCM, Mar-aging steels; stainless steels such as JIS SUS 630, special steels and the like.

The buffer layer material which is preferably employed in the present invention comprises:
(i) materials or metals with low Young's modulus such as Cu, Ag, Ni, Kovar, Fe-42% Ni alloy etc.
(ii) materials with low coefficient of thermal expansion such as W, Mo, W alloys, Nb or ceramic materials of $Si_3N_4$, SiC etc.
(iii) a combination of the materials of any of above (i) and (ii).

The braze which may be preferably employed in the present invention comprises Ag-Cu braze, Ag braze, Ni-type braze, Pd-type braze or the like.

Auxiliary measures such as metallizing on the ceramic shaft end will contribute to the high joining strength. The metallizing may be produced either by vapor deposition technique (multiplied layers of Ti-Cr-Cu, Ti-Ni etc) or by activated metal technique. The latter technique can be those disclosed in U.S. Pat. No. 4,160,854, EP-0038584A or Japanese-patent Kokai-publication No. 56-163093.

The preferred configuration of the center void in the ceramic shaft end assumes following dimensions. Namely, the maximum diameter of the void should be determined based on the junction strength which is represented by the formula:

$$\tau = \frac{16 d_2}{\pi(d_2^4 - d_1^4)} T \qquad (1)$$

wherein $\tau$ is shear strength kg/cm²;

T is torsion Torque kg·cm;

$d_1$ is void diamer cm; and $d_2$ is shaft diameter cm

Typical results calculated based on the formula (1) for $\tau = 1560$ kg/cm² are shown in Table 1.

TABLE 1

| $d_1$ (cm) | $d_2$ (cm) | T (kg · cm) |
|---|---|---|
| 0.9 | 1.5 | 900 |
| 1.2 | 1.5 | 610 |

Thus void diameter should be no greater than 80% of the shaft diameter.

On the other hand, the void diameter should be limited in view of the heat insulation efficiency. Since the outer surface of the shaft is usually cooled by coolant (such as oil), the center void can effectively insulate the heat coming from the heat source (turbine rotor). In view of above, the void diameter should be no less than 30% of the ceramic shaft.

The length (depth) of the void should be at least 20% of the shaft diameter in view of the heat insulation effect.

Figure 3A:
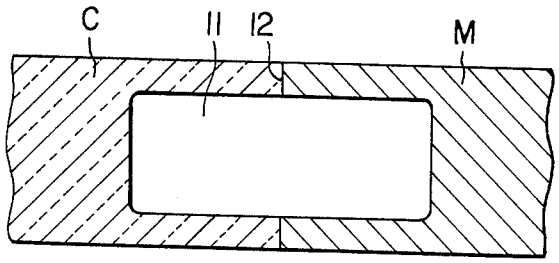
FIGS. 3(a) and (b) show longitudinal sections of the structure of the junction of the pieces under test for the purpose of comparison.
Figure 3B:
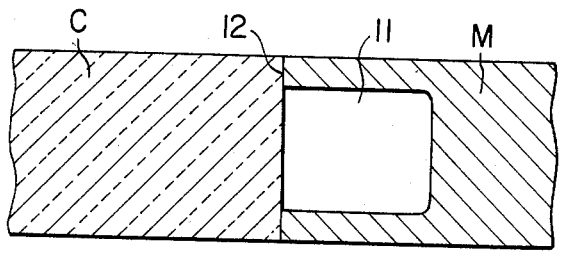
FIG. 3(c) shows a similar view of one embodiment of the present invention.
Figure 3C:
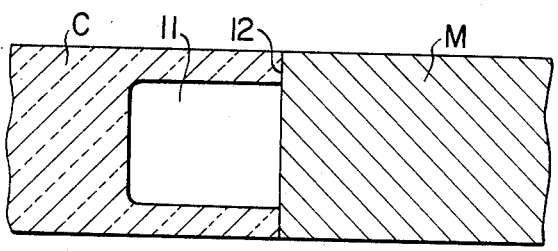

The transverse section of the void is preferably round, however, does not exclude any other symmetric shapes such as a polygon. The bottom of the void may be also conic, curved or the like contour. Example:

For the purpose of making a close comparison between the junction structures of the present invention and the prior art were prepared the test pieces as shown in FIGS. 3(a), (b) and (c). In FIG. 3(a), a ceramic shaft C and a metal shaft M were butt-weleded end-to-end at 12 with a void 11 for heat insulation being provided within both shafts. In FIG. 3(b), a ceramic shaft C and a metal shaft M were joined together at 12 with a void 11 for heat insulation being provided within the end of M. FIGS. 3(a) and (b) both show control examples. In FIG. 3(c), a ceramic shaft C and a metal shaft M were joined together at 12 with a void 11 for heat insulation being provided within the end of the ceramic shaft.

Referring to the samples under test, both the metal shaft and the ceramic shaft had an outer diameter of 15 mm with the void for heat insulation being 9 mm in inner diameter and 8 mm in length. The metal shaft was made of steel, and silicon nitride and silicon carbide were used as the ceramic shaft. 1000 Å-thick Ti, 1000 Å-thick Cr and 10,000 Å-thick Cu were metallized in that order on the surface of the ceramics by means of the physical vapor deposition technique. As the intermediate buffer layer use was made of a 0.5 mm-thick Cu plate. Brazing was carried out in a hydrogen furnace at 900° C. using a eutectic Ag-Cu brazing metal as the brazing material.

Ten pieces for each of the samples of FIGS. 3(a), (b) and (c) were prepared to determine the torsion torque thereof, which was measured at room temperature after joining. The brazing was carried out using a jig with a sufficiently large mass so as to not affect the cooling rate of the sample pieces. As a result; it has been proved that, in the sample pieces of FIGS. 3(a) and (b), the ceramic shafts are all broken at less than 500 kg·cm whereas, in the sample pieces according to the present invention, the ceramic shafts are not broken in a torsion torque of as high as 800 kg·cm or more, and are thus excellent.

What is claimed is:

1. In a composite shaft comprised of a ceramic shaft and a metal shaft which is butt-joined to the end of the ceramic shaft, the ceramic shaft being on the side of a rotor to be operated at a higher temperature than the metal shaft, the improvement comprises a junction structure of the composite shaft wherein a void for heat insulation is provided only within the central portion of the abutting end of said ceramic shaft.

2. The shaft as defined in claim 1, wherein the ceramic shaft is solid with the rotor.

3. The shaft as defined in claim 1, wherein the composite shaft is a turbine shaft and the rotor is a turbine rotor.

4. The shaft as defined in claim 1, wherein the void has a diameter of no greater than 80% of the ceramic shaft diameter.

5. The shaft as defined in claim 4, wherein the void has a diameter of at least 30% of the ceramic shaft diameter.

6. The shaft as defined in claim 5, wherein the void has a length of at least 20% of the ceramic shaft diameter.

7. The shaft as defined in claim 1, wherein the junction includes brazing to join said ceramic shaft and the metal shaft.

8. The shaft as defined in claim 7, wherein the junction includes a buffer material layer between the ends of both shafts.

9. The shaft as defined in claim 7, wherein the junction includes a metallized layer on the surface of the end of the ceramic shaft.

* * * * *